Aug. 31, 1926.

W. E. WILSON 1,597,944

TRANSMISSION MECHANISM

Original Filed May 3, 1924

INVENTOR
William E. Wilson
BY
*[signature]*
ATTORNEY

Patented Aug. 31, 1926.

1,597,944

UNITED STATES PATENT OFFICE.

WILLIAM E. WILSON, OF DENVER, COLORADO, ASSIGNOR OF ONE-HALF TO CODY McLAUGHLIN AND THREE-EIGHTHS TO FRANK O. BLACKMAN, BOTH OF DENVER, COLORADO.

TRANSMISSION MECHANISM.

Application filed May 3, 1924, Serial No. 710,701. Renewed January 22, 1926.

An object of this invention is to provide an improved construction for a transmission mechanism.

A further object of this invention is to provide an improved construction for a transmission mechanism in which the various ratio-determining gears are in mesh and there is a minimum of shifting of gears, the relation of some of the gears in use being carried out by throwing in and out of locking lugs operated internally of certain gears.

My invention consists in the construction, arrangement and combination of elements hereinafter set forth, pointed out in the claims and illustrated by the accompanying drawing, in which—

Figure 1:
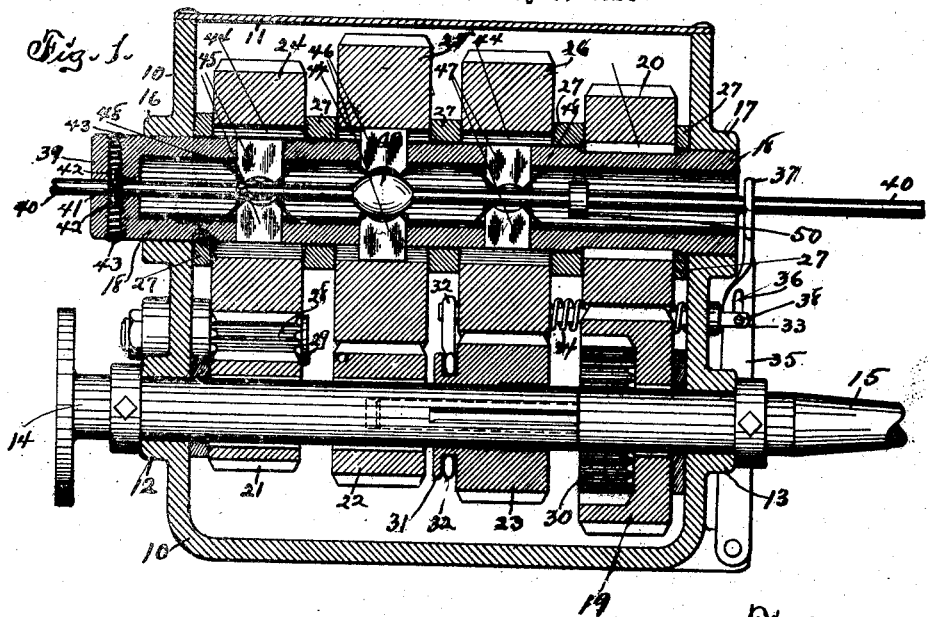
Figure 1 is a longitudinal section and Figure 2 is a detail fragmentary cross-section illustrating the preferred form of my improved device.
Figure 2:
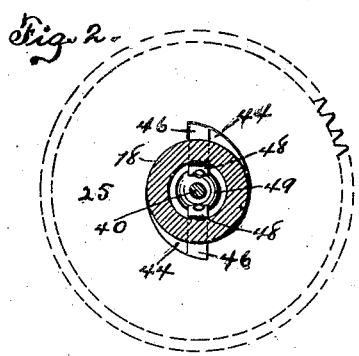

In the construction of the mechanism as shown the numeral 10 designates a housing, which is provided with a removable and replaceable cover plate 11 giving access to the interior of the housing. Registering bearings 12, 13 are formed in the lower portions of the ends of the housing 10 and shafts 14, 15 are journaled therein, the shaft 15 being formed with a journal end entering and pivotally supporting the adjacent end portion of the shaft 14, as shown by dotted lines in Fig. 1. The shaft 14 is adapted to be connected to an engine or motor and is hereinafter referred to as the engine shaft, while the shaft 15 is adapted to be connected to any device to be driven, such as the propeller shaft of an automobile, and hereinafter is referred to as the follower shaft. Registering bearings 16, 17 are formed in the upper portions of the ends of the housing 10 and a hollow countershaft 18 is journaled in said bearings parallel with the shafts 14, 15. Intermeshing gears 19, 20, substantially alike in diameter, are mounted rigidly on the shafts 15 and 18, to transmit power from the countershaft to the follower shaft. Gears 21, 22, and 23, of progressively increasing diameters, are mounted on the engine shaft; the gears 21 and 22 being secured rigidly to the shaft, while the gear 23 is splined to and shiftable longitudinally of the shaft. Gears 24, 25 and 26 of varying diameters are mounted loosely on the hollow countershaft 18 and are spaced apart and from the gear 20 and one end of the housing by suitable loose collars or bushings 27. The gears 25 and 26 are in mesh with the gears 22 and 23 respectively at all times. The gear 24 is in mesh with a reversing pinion 28 journaled on a stub shaft 29 fixed in and projecting inwardly from the adjacent end portion of the housing, and said pinion is in mesh at all times with the gear 21. The gear 19 is formed with an internal gear 30 adapted to receive and mesh with the external gear 23, which is shiftable on the engine shaft 14. The gear 23 is formed with an annularly-grooved hub 31 on one end adapted to receive and journal in a shifting fork 32 extending obliquely on a plane between the gears 25, 26. A shifting rod 33 is mounted for reciprocation through one end of the housing 10 and is connected at its inner end to said fork. An expansive coiled spring 34 is mounted on the rod 33 and impinges at opposite ends on the fork and housing end respectively, tending to move the fork and gear 23 toward the center of the housing and away from the gear 19. A lever 35 is fulcrumed at one end on the housing 10 and is formed with a slot 36 between its ends and also is formed with a fork 37 on its free end, the opening of the fork registering with the bore of the hollow countershaft 18. The rod 33 lies in a plane outside of and at right angles to the planes of the gears 20 and 26 and the outer end of said rod is connected to the lever 35 pivotally and slidingly by means of a pin 38 extending loosely through the slot 36. A bearing 39 is formed in one end portion of the hollow countershaft 18 and an adjusting rod 40 is mounted for reciprocation in said bearing and extends throughout and projects at both ends from said shaft. The adjusting rod 40 is formed with a series of spaced annular grooves 41, preferably V-shaped in cross-section, and spring-backed check-pins 42 are mounted in radial holes in the bearing 39 and countershaft 18 and are adjusted by screws 43 in said holes. The gears 24, 25 and 26 are formed with internal ratchet-shaped slots 44 (Fig. 2). Pairs 45, 46, 47 of locking lugs are mounted for reciprocation in diametrically opposite slide bearings or slots in the hollow countershaft 18 and are adapted to be moved selectively outwardly radially thereof into engagement with the radial walls of the slots 44 of the gears. The lugs 45, 46 and 47 are each formed with beveled inner ends and leaf springs 48 are fixed to said beveled faces and extend laterally from each of the locking lugs and bear slidingly at their outer ends on the wall of the bore of the shaft 18 and tend to move said lugs toward the rod 40. The locking lugs preferably are formed with curved cavities on their inner ends adapted to receive at times and partially embrace and form a check for a boss 49, of oblate form, fixed to the adjusting rod 40. A collar 50 is fixed to the adjusting rod 40 between the boss 49 and fork 37 and spaced from said boss.

In practical use of the mechanism thus far described, the adusting rod 40 is moved to the left so as to locate the boss 49 in the space between the pairs of locking lugs 45 and 46, which is a neutral space, permitting all of the lugs to be withdrawn by their springs 48 out of engagement with gears 24, 25 and 26. The engine shaft 14 being under rotation the gears 21, 22 and 23 mesh with and drive the gears 24, 25 and 26 idly and the hollow countershaft 18 is held stationary by the load of the follower shaft 15. When it is desired to drive the follower shaft reversely, the adjusting rod is moved to place the boss 49 between and force the locking lugs 45 outwardly into engagement with the gear 24, thus locking said gear to the countershaft 18, rotating the countershaft and gear 20 thereon and rotating the follower shaft through the medium of the gear 19. Opposite movement of the rod 40 releases the reverse gear and places the boss 49 again in neutral position. When it is desired to drive the follower shaft forwardly, the adjusting rod is moved to place the boss 49 between and cause it to force the lugs 46 outwardly into engagement with the gear 25, thus locking said gear to the countershaft 18, rotating said countershaft and gear 20 thereon and rotating the follower shaft through the medium of the gear 19 at a given ratio known as "low". Then the adjusting rod may be moved further in the direction last suggested to release the boss 49 from the lugs 46 and place it, after crossing a neutral space, between and in position to force outwardly the lugs 47 into engagement with the gear 26, thus locking said gear to the countershaft 18, rotating the countershaft and gear 20 thereon and rotating the follower shaft through the medium of the gear 19 at a different ratio known as "second" or "intermediate". Then the adjusting rod may be moved further in the direction last suggested to release the boss 49 from the lugs 47 and place it neutrally, and further to cause the collar 50 to engage the fork 37 and move the lever 35 outwardly through an arc to the end of shifting the gear 23 into mesh with the internal gear 30, thus directly locking the engine shaft 14 to and thereby driving the follower shaft at a different speed known as "high". It will be observed that the boss 49 must be operated to connect the low and intermediate gears respectively progressively and in advance of the operation of the high gear connection. The check device supplied by the pins 42 engaging in one or another of the annular grooves 41, tends to hold the adjusting rod 40 in one or another of its four operative positions, pending positive movement of said rod by any means employed for that purpose, such as a shifting lever not shown. After operating the mechanism at "high" speed, the rod 40 may be operated to place the boss 49 in any other of the several positions described, but the return to "low" must be through intermediate" and the return to "reverse" must be through "low". When "high" is abandoned by release of the engaging pressure through the lever 35, the spring 34 returns the fork 32 to neutral position and thus the gear 23 is disengaged from the gear 30 and returned to sole engagement with the gear 26. It will be observed that during the "high" operation the gear 23 engages both of the gears 26 and 30, so that in being returned and disengaged from the gear 30 it does not have to pick up the gear 26, thus avoiding any risk of stripping it or the latter gear.

Figure 3:
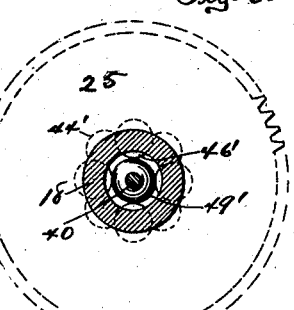
Figures 3 and 4 are fragmentary cross-sections at right angles to each other, illustrating a modified form of connection usable in the device.
Figure 4:
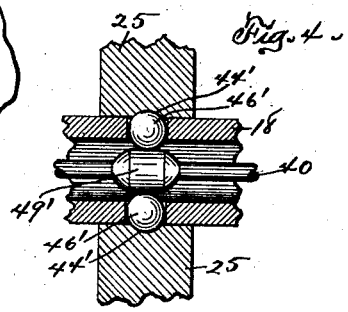

In Figures 3 and 4 the gear 25 (or it may be 24 or 26) is shown with concaved seats 44′ in its bore instead of the ratchet slots 44, which seats are parti-spherical. Also balls 46′ are substituted for the lugs 46 and the boss 49′ on the rod 40 is shown with a cylindrical central portion and rounded ends. The springs are omitted. When the boss 49′ is withdrawn from the balls to neutral position, said balls will offer little or no force in connecting the countershaft 18 to the gear but will ride freely in the countershaft. When the boss 49′ is positioned as shown, it holds the balls in the cup-shaped seats 44′ and effects an operative connection between the gear and the countershaft.

Figures 5, 6:
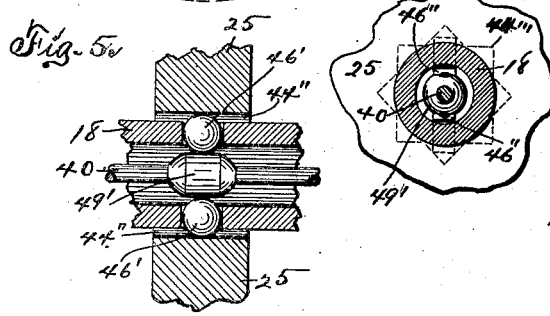
Figure 5 is a fragmentary longitudinal section illustrating a further modified form of connection usable in the device.
Figure 6 is a fragmentary cross-section illustrating a further modified form of connection usable in the device.

In the construction as shown in Figure 5, concaved groves 44″ are formed in the bore of the gear as a substitute for the cup seats 44′, the structure and operation of the balls and boss being the same as is described in connection with Figures 3 and 4.

In the contruction of the device as shown in Figure 6 right-angled seats (dotted lines) 44''', eight in number, are formed in the bore of the gear as a substitute for the cup seats 44' and the locking lugs 46'' are formed as pins with pointed outer ends adapted to engage in said seats, said lugs being operated in one direction by the boss 49' on the rod 40. The operation of the pins or lugs 46'' relative to the seats 44''' is substantially the same as that of the balls 46' and cup seats 44'.

I claim as my invention—

1. A transmission mechanism comprising alining engine and follower shafts, a hollow countershaft parallel therewith, intermeshing gears of substantially the same diameter fixed respectively to the follower and countershafts, driving gears of progressively increasing diameters mounted on and for rotation with the engine shaft, one of the driving gears being slidably mounted and adapted to engage the gear on the follower shaft at times, gears of varying diameters loosely mounted on the countershaft, some of the gears on the engine shaft intermeshing at all times with some of the gears on the countershaft, a reverse gear intermeshing with and connecting one of the gears on the engine shaft with one of the gears on the countershaft, locking means carried by the countershaft adapted to engage the loosely-mounted gears thereon, and adjusting means adapted progressively to operate said locking means and also adapted to operate the shiftable gear.

2. A transmission mechanism comprising alining engine and follower shafts, a hollow countershaft parallel therewith, intermeshing gears of substantially the same diameter fixed respectively to said shafts, driving gears of progressively increasing diameters mounted on said engine shaft, some of said gears being fixed to said engine shaft, another of said driving gears being slidable on said engine shaft and adapted to engage and drive the gear on the follower shaft, gears of various diameters loosely mounted on the countershaft, some of the driving gears intermeshing at all times with some of the loosely-mounted gears on the countershaft, locking means carried by the countershaft, and an adjusting device mounted for reciprocation in and longitudinally of the hollow shaft and adapted progressively to engage and connect said locking means to one or another of said loosely-mounted gears on said countershaft.

3. A transmission mechanism comprising alining engine and follower shafts, a hollow countershaft parallel therewith, intermeshing gears of substantially the same diameter fixed respectively to said shafts, driving gears of progressively increasing diameters mounted on said engine shaft, some of said gears being fixed to said engine shaft, another of said driving gears being slidable on said engine shaft and adapted to engage and drive the gear on the follower shaft, gears of various diameters loosely mounted on the countershaft, some of the driving gears intermeshing at all times with some of the loosely-mounted gears on the countershaft, a shifting device connected with said slidable gear, locking means carried by the countershaft, an adjusting rod mounted for reciprocation in and longitudinally of the hollow shaft, a device on said rod adapted to engage progressively said locking means and connect with one or another of the loosely-mounted gears on said countershaft, and a device on said rod adapted to engage said shifting device and operate the same to connect the slidable gear to the gear on the follower shaft.

4. In a transmission mechanism, a hollow countershaft, a plurality of gears loosely mounted in spaced relation on said shaft, spaced locking devices carried by said shaft within the bores of the respective gears, an adjusting rod mounted for reciprocation longitudinally of said shaft and extending therefrom, a device on said rod adapted to be moved thereby into operative engagement with respective locking devices for engagement thereof with a respective gear, a shiftable gear extraneous to said countershaft, a shifting device operating thereon, and a device on the adjusting rod adapted to engage said shifting device when all of the loosely-mounted gears are released from said shaft.

5. In a transmission mechanism, a hollow shaft, a gear journaled thereon, said gear being formed with seats in its bore, locking lugs mounted for radial reciprocation in said shaft, springs fixed in the inner ends of said lugs and engaging the inner face of the bore of said shaft, an adjusting rod mounted for rectilinear reciprocation in said shaft and a boss on said rod adapted to enter between, separate and move said lugs outwardly into engagement with the seats in the gear.

6. In a transmission mechanism, a hollow shaft, a gear journaled thereon, said gear being formed with seats in its bore, locking devices mounted for radial movement in said shaft, leaf springs fixed to the inner ends of said lugs and extending oppositely into sliding engagement with the wall of the bore of said shaft, an adjusting rod mounted for rectilinear reciprocation in said shaft, and a boss on said rod adapted to enter between, separate and move said locking devices outwardly into engagement with said seats in the gear.

7. In a transmission mechanism, a hollow shaft, a gear journaled thereon, said gear being formed with ratchet-shaped seats in its bore, said shaft being formed with radial slots, locking lugs mounted for reciprocation in said slots and shaped at their outer ends to engage in said seats, and also beveled oppositely at their inner ends and concaved between the beveled faces, leaf springs fixed to the beveled inner faces of the lugs and extending oppositely therefrom into sliding engagement with the wall of the bore of said shaft, an adjusting rod mounted for rectilinear reciprocation in said shaft, and a boss on said rod adapted to enter between, separate and move said locking devices outwardly into engagement with the seats in the gear.

Signed at Denver, in the county of Denver and State of Colorado, this 8th day of April, 1924.

WILLIAM E. WILSON.